United States Patent
Jhanwar et al.

(10) Patent No.: US 12,373,316 B2
(45) Date of Patent: Jul. 29, 2025

(54) AUTOMATING PCIE 6.0 TX EQUALIZER CALIBRATION USING A MULTIVARIABLE APPROACH

(71) Applicant: Tektronix, Inc., Beaverton, OR (US)

(72) Inventors: Nitin Jhanwar, Bengaluru (IN); Sakshi Gupta, Bengaluru (IN); Srevats S. Laxman, Bengaluru (IN)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 18/444,434

(22) Filed: Feb. 16, 2024

(65) Prior Publication Data

US 2024/0281347 A1 Aug. 22, 2024

(30) Foreign Application Priority Data

Feb. 17, 2023 (IN) .............................. 202321010810

(51) Int. Cl.
*G06F 11/22* (2006.01)
*G06F 13/42* (2006.01)

(52) U.S. Cl.
CPC ...... *G06F 11/2221* (2013.01); *G06F 13/4221* (2013.01)

(58) Field of Classification Search
CPC .......................... G06F 11/2221; G06F 13/4221
See application file for complete search history.

(56) References Cited

U.S. PATENT DOCUMENTS 11,435,394 B1 * 9/2022 Noujeim ............ G01R 31/2832
2013/0145212 A1 * 6/2013 Hsu .......................... H04L 1/24
714/27

(Continued)

FOREIGN PATENT DOCUMENTS

CN 110659171 A 1/2020
CN 112313881 A 2/2021
(Continued)

OTHER PUBLICATIONS

F. E. Rangel-Patiño et al, "PCIe Gen6 Physical Layer Equalization Tuning by Using Unsupervised and Supervised Machine Learning Techniques," 2023 IEEE MTT-S Latin Microwave Conference (LAMC), San José, Costa Rica, 2023, pp. 105-108 (Year: 2023).*

(Continued)

*Primary Examiner* — Matthew M Kim
*Assistant Examiner* — Indranil Chowdhury
(74) *Attorney, Agent, or Firm* — Miller Nash LLP; Andrew J. Harrington

(57) ABSTRACT

A receiver test and measurement system includes a signal generator to provide a stressed signal. The stressed signal needs to be calibrated as per specification for several parameters. Some parameters including a set of two or more equalization parameters can be calibrated by a test and measurement instrument that captures the stressed signal and executes a calibration operation. A multi-variable model is created establishing a relationship between parameters that are set in the signal generator and the measured values of these parameters in a test and measurement equipment like an oscilloscope. The multi-variable model calculates coefficients that allows us to calculate setting values that need to be set in the signal generator for any desired combination of two or more equalization parameters. This allows receiver tests to be done for any combination of desired equalization parameters in a calibrated manner.

21 Claims, 8 Drawing Sheets

(56) References Cited

U.S. PATENT DOCUMENTS

| | | | | |
|---|---|---|---|---|
| 2014/0103907 A1* | 4/2014 | Muecke | ............... | G01R 35/005 |
| | | | | 324/130 |
| 2014/0297915 A1* | 10/2014 | Wu | ..................... | G06F 13/4068 |
| | | | | 710/313 |
| 2015/0103874 A1 | 4/2015 | Wall | | |
| 2015/0285892 A1* | 10/2015 | Muecke | ............. | G01R 31/3191 |
| | | | | 324/130 |
| 2020/0025824 A1* | 1/2020 | Zhao | ..................... | G11C 29/022 |
| 2020/0333396 A1* | 10/2020 | Zhao | ................ | G01R 31/31709 |
| 2022/0192486 A1* | 6/2022 | Ghose | ................ | G01R 31/3171 |

FOREIGN PATENT DOCUMENTS

| | | | |
|---|---|---|---|
| CN | 114779171 A | 7/2022 | |
| WO | WO-2024173879 A1 * | 8/2024 | .......... G06F 11/2221 |

OTHER PUBLICATIONS

Samie B. Samaan et al., "High-speed Serial Bus Repeater Primer", Oct. 2015, pp. 1-68, Revision 1.2, Retrieved from https://www.intel.sg/content/dam/www/public/us/en/documents/white-papers/serial-bus-white-paper.pdf.

Korean Intellectual Property Office, International Search Report and Written Opinion for PCT Application No. PCT/US2024/016283 filed Feb. 16, 2024, Jun. 10, 2024, 11 pages, KIPO, Daejeon, Republic of Korea.

\* cited by examiner

AUTOMATING PCIE 6.0 TX EQUALIZER CALIBRATION USING A MULTIVARIABLE APPROACH

CROSS-REFERENCE TO RELATED APPLICATIONS

This disclosure claims priority under 35 U.S.C. § 119 to Indian Provisional Patent Application No. 202321010810, filed Feb. 17, 2023, titled "AUTOMATING GEN6 TX EQUALIZER CALIBRATION USING A MULTIVARIABLE APPROACH," the disclosure of which is incorporated herein by reference in its entirety.

TECHNICAL FIELD

The present disclosure relates generally to the testing of electronic circuits, and more specifically to automated calibration of a stressed-eye signal for receiver (RX) testing of a Peripheral Component Interconnect Express (PCIe) bus of a device under test (DUT).

BACKGROUND

Peripheral Component Interconnect Express (PCIe) is a standard for a high-speed serial computer expansion bus that is ubiquitous in electronic devices such as motherboards for personal computers, graphics cards, and solid state drives (SSDs). PCIe 6.0 is the most recent generation of the PCIe standard and includes data transfer rates of up to 64 Giga transfers per second (GT/s). A device under test (DUT) including a PCIe 6.0 bus must be tested to ensure the proper operation of components of the bus, such as transmitters (TXs) and receivers (RXs), contained in the DUT. Testing of receivers RX in PCIe 6.0 buses includes stressed eye calibration testing in which a signal generator, such as a pulsed pattern generator (PPG) of a bit error rate tester (BERT), must be calibrated to generate a signal having a stressed eye that is then supplied to receivers RX in the DUT. This signal having a stressed eye will be referred to as a "stressed signal" in the present description. The stressed signal generated by the signal generator must be calibrated to provide a worst-case signal having parameters (e.g., eye height and eye width) that fall within tolerances specified in the PCIe 6.0 standard. The stressed signal is then supplied to a receiver RX of the DUT to verify that, even when receiving this worst-case stressed signal, the receiver still stressed signal makes the right decisions in relation to this signal.

Accurate calibration of the stressed signal for testing of a receiver Rx is required as part of silicon validation and compliance testing, which is performed on the physical layer of the PCIe 6.0 bus of a DUT. To perform calibration of the signal generator, a test and measurement instrument, typically an oscilloscope, is coupled to the signal generator, and the signal generator is then calibrated to provide a stressed signal that replicates a worst-case PCIe 6.0 transmitter Tx as defined in the PCIe 6.0 standard. One operating characteristic that needs to be calibrated for the signal generator providing the stressed signal is equalization (EQ), where equalization includes precursor (i.e., preshoot) and postcursor (i.e., de-emphasis) parameters. Prior generations of PCIe utilized only one preshoot parameter and one de-emphasis parameter, and these two parameters were largely independent of each other and therefore could be calibrated independently. In contrast, the PCIe 6.0 standard includes first and second preshoot parameters along with one de-emphasis parameter to provide the equalization required to accommodate the increased data transfer rates in this standard. The required setting on the signal generator for this second preshoot parameter is also a function of the measured values for the first and second preshoot parameters and the de-emphasis parameter. This significantly complicates the calibration process of the signal generator to provide the required stressed eye signal. Current industry standard methods for calibrating a signal generator using the "brute force" method (i.e., manually adjusting values of the preshoot and de-emphasis parameter) to provide the required stressed signal for testing of receivers RX in a DUT according to the PCIe 6.0 standard may take up to eighteen hours, or more. Accordingly, there is a need for improved methods and systems for calibrating signal generators to provide required stressed signals for performing testing of receivers RX of DUTs in accordance with the PCIe 6.0 standard.

BRIEF DESCRIPTION OF ACCOMPANYING DRAWINGS

Figure 1:
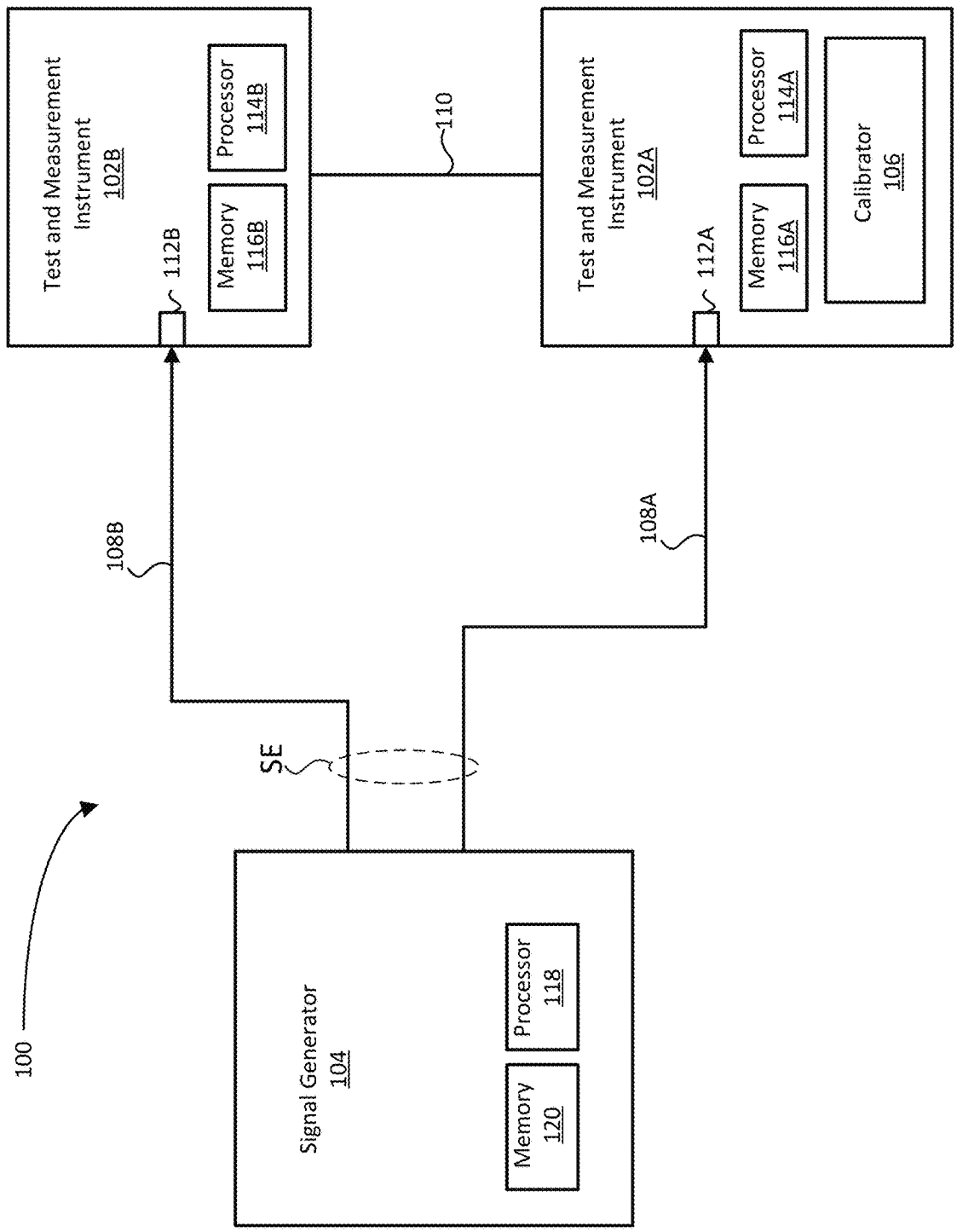
FIG. 1 is a block diagram of a test and measurement system including a master test and measurement instrument that executes a calibration operation to calibrate a signal generator for providing a stressed signal in accordance with the PCIe 6.0 standard in accordance with some embodiments of the present disclosure.

It should be appreciated by those skilled in the art that any block diagrams herein represent conceptual views of illustrative systems embodying the principles of the present disclosure. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Embodiments of the present disclosure use a multi-variable model for the relationship between set values and measured values for equalization parameters Preshoot1 (PS1), Preshoot2 (PS2), and de-emphasis (DE) that are utilized under the PCIe 6.0 standard in calibrating a stressed signal for testing of a receiver RX. In some embodiments, the multi-variable model, process, or algorithm may reduce the time required for calibration of the signal generator to approximately fifteen minutes as compared to the eighteen hours or more that is typical using conventional iterative calibration processes for stressed eye calibration according to the PCIe 6.0 standard. The PCIe 6.0 standard defines 127 preset combinations or "presets" of allowable combinations of values for the PS1, PS2, and DE equalization parameters to be utilized in signal generator calibration. In some embodiments, the multi-variable model utilizes two different models as part of the signal generator calibration process: 1) a linear two-variable model for the PS1 and DE equalization parameters for preset combinations where the equalization parameter PS2=0; and 2) a linear three-variable model for preset combinations where the parameter PS2≠0.

The two-variable model is calculated using several different combinations of the parameters PS1 and DE (PS2=0), and the three-variable model is calculated using different combinations of the parameters PS1, PS2, and DE. For each of these models, an oscilloscope is coupled to the signal generator and to capture the stressed signal provided by the signal generator for each of these different combinations of equalization parameters PS1, PS2, and DE. A calibration process then utilizes the data set formed by these captured samples of the stressed signal to calculate dependency parameters estimating the relationship or dependency between each of the set equalization parameters PS1, PS2, and DE on the signal generator and the actual or measured equalization parameters generated from the samples of the stressed signal captured by oscilloscope. Once each of these models has been calculated, the signal generator may then be calibrated by setting the equalization parameters PS1, PS2 and DE on the signal generator based on the estimated dependency variables for the corresponding model.

In the present description, the preset combinations of the equalization parameters PS1, PS2, and DE that are configured or set on the signal generator may be referred to as the "setting" or "set" equalization parameters, and be designated as PS1(setting), PS2(setting), and DE(setting). Conversely, the equalization parameters PS1, PS2, DE measured by the one or more test and measurement instruments may be referred to as the "measured" equalization parameters, and be designated as PS1(measured), PS2(measured), and DE(measured).

FIG. 1 is a block diagram of a test and measurement system 100 including master and extension test and measurement instruments 102A, 102B that capture samples of a stressed signal SE provided by a signal generator 104 and execute a calibration operation, or process, using a calibrator 106 to calibrate the signal generator to provide a stressed signal SE according to a specified specification or standard for testing a device under test (DUT). In the embodiment of FIG. 1, the master test and measurement instrument 102A executes the calibrator 106 to calculate a multi-variable model defining the relationship or dependencies between set equalization parameters PS1(setting), PS2(setting), and DE(setting) on the signal generator 104 and the actual or measured equalization parameters PS1(measured), PS2(measured), and DE(measured) measured by the test and measurement instruments 102A, 102B based on the data set defined by the samples of the stressed signal SE captured by these test and measurement instruments 102A, 102B. The calibrated signal generator 104 may then be used to perform testing of a DUT. In some embodiments, the calibrated signal generator 104 may be utilized to perform testing of a receiver RX of a PCIe 6.0 bus of a DUT. The testing of a receiver RX as well as a more detailed description of the calibrator 106 and multi-variable model utilized by this calibrator will be discussed in more detail below with reference to FIGS. 2 and 3.

Embodiments of the test and measurement system 100 of FIG. 1 and other embodiments of the present disclosure described below will be described in relation to the PCIe 6.0 standard. Embodiments of the proposed multi-variable operation and calibration process are not, however, limited to the PCIe 6.0 standard. In further embodiments, the multi-variable model and calibration process may be applied to many other high-speed input/output (IO) data transfer technologies like the Ethernet standards and Universal Serial Bus (USB) standards (e.g., USB4 Version 2.0), as well as any similar future developed data transfer technologies or standards.

The stressed signal SE provided by signal generator 104 is a differential signal that is provided, after calibration of the signal generator 104, on a lane of the PCIe 6.0 bus of the DUT to be tested, as will be discussed in more detail with reference to FIG. 2. A lane of a PCIe 6.0 bus is a single communication path over which data is sent and received between electronic devices coupled to the bus. In PCIe 6.0, each lane includes two differential signaling pairs, one pair for transmitting data and the other pair for receiving data. Each lane accordingly includes four conductive traces. In the test and measurement system 100, the stressed signal SE generated by the signal generator 104 is a differential signal pair. One signal of this differential signal pair is provided over a suitable communication link 108A to the master test and measurement instrument 102A while the other signal is provided over a suitable communication link 108B to the extension test and measurement instrument. Each communication link 108A, 108B would typically include suitable interconnect structures, such as cables, to interconnect the signal generator 104 and test and measurement instruments 102A, 102B. In some embodiments, however, the communication links 108A, 108B may include other suitable interconnect fixtures or connectors as required in a given application.

In the test and measurement system 100, the master test and measurement instrument 102A and extension test and measurement instrument 102B form a multi-stack test subsystem. The test and measurement instruments 102A, 102B are synchronized for capturing the pair of differential signals forming the stressed signal SE from the signal generator 104. Each of the test and measurement instruments 102A, 102B is an oscilloscope in some embodiments. The designation of each test and measurement instrument 102A, 102B as either the master or an extension configures each test and measurement instrument 102A, 102B to function accordingly, with the master test and measurement instrument 102A being configured to communicate control signals over a communication link 110 to the extension test and measurement instruments 102B to synchronize test and measurement instruments to simultaneously capture or acquire the differential signals forming the stressed signal SE.

In some embodiments, each of the test and measurement instruments 102A, 102B is a Tektronix oscilloscope (e.g., DPS77004SX oscilloscope) and the communication link 110 is the UltraSync multi-unit time synchronization bus by Tektronix. The master test and measurement instrument 102A communicates control signals over the communication link 110 to the extension test and measurement instruments 102B to synchronize the capture of the stressed signal SE by the two test and measurement instruments. In some embodiments, the master test and measurement instrument 104A provides a sample clock signal over the communication link 110 for use by the test and measurement instruments 102A, 102B in synchronizing the simultaneous acquisition of the pair of differential signals forming the stressed signal SE. The master test and measurement instrument 102A may also provide a trigger signal over the communication link 110 to control the starting and stopping of capture cycles for the test and measurement instruments 102A, 102B. For example, the master test and measurement instrument 102A may provide the trigger signal to start a capture cycle of the stressed signal SE for a given preset combination equalization parameters EQ on the signal generator 104. The master test and measurement instrument 102A may also control the transfer of data over the communication link 110 from the extension test and measurement instrument 102B to the master test and measurement instrument. This data transferred over the communication link 110 corresponds to acquired samples of the one of the differential signals of the stressed signal SE captured by the extension test and measurement instruments 102B during respective captures cycles for each of the preset combinations of equalization parameters EQ set on the signal generator 104.

Each communication link 108A, 108B is coupled to a respective channel or test port 112A, 112B of the corresponding test and measurement instrument 102A, 102B. The embodiment of the system 100 in FIG. 1 includes two test and measurement instruments 102A, 102B because, where these instruments are oscilloscopes, there are limitations on the number of high bandwidth test ports 112A, 112B available on each oscilloscope. As will be appreciated by those skilled in the art, high bandwidth channels or test ports on oscilloscope and other test and measurement instruments are high cost, and, as a result, the number of such high bandwidth test ports available on each oscilloscope is limited. In PCIe 6.0, each of the test ports 112A, 112B must have a bandwidth sufficient to capture stressed signals at a data transfer rate of up to 40 GT/s. A typical oscilloscope capable of capturing signals having a 40 GT/s transfer rate will include only one test port 112A, 112B capable of capturing such a high bandwidth signal. As a result, a pair of oscilloscopes is required for testing of receiver RX of each lane of the PCIe 6.0, each oscilloscope in the pair receiving one of the signals in the differential pair of signals in the stressed signal SE. If an oscilloscope or other test and measurement instrument 102A, 102B includes multiple channels having a bandwidth high enough to acquire signals at a data transfer rate of up to 40 GT/s, then only one such oscilloscope or other test and measurement instrument is required. Accordingly, in such an embodiment, the test and measurement system 100 would include only a single test and measurement instrument 102 having a pair of test ports 112, each test port of the pair coupled to receive a respective one of the differential signals forming the stressed signal SE.

Each of the test and measurement instruments 102A, 102B includes a processor 114A, 114B coupled to a memory 116A, 116B. Each memory stores suitable software or firmware that the processor 114A, 114B executes to control the overall operation of the instrument 102A, 102B. The memories 116A, 116B also store a data set corresponding to the samples of the acquired stressed signal SE. The memory 114A of the master test and measurement instrument 102A also stores suitable software or firmware that is executed by the processor 114A to implement the calibrator 106. The signal generator 104 also includes a processor 118 coupled to a memory 120 that stores suitable software or firmware which, when executed by the processor, controls the overall operation of the signal generator. For example, in embodiments of the system 100 the signal generator 104 may be a bit error rate tester (BERT) (e.g., Anritsu MP1900A BERT). When the signal generator 104 is a BERT, the processor 118 executes instructions stored in the memory 120 to control a pulsed pattern generator (PPG) of the BERT to generate the stressed signal SE. The signal generator 104 is not limited to being a BERT, and in further embodiments of the system 100 the signal generator may be other types of signal generators such as an arbitrary waveform generator (AWG).

In embodiments of the present disclosure, the calibrator 106 can be implemented through one or more processors 114A on the master test and measurement instrument 102A, but in different embodiments, the one or more processors may reside on the extension test and measurement instrument 102B, may reside on the signal pattern generator 104, or may reside on one or more external computing devices including cloud-based processors, or may be distributed among one or more of the master and extension test and measurement instruments 102A, 102B, the signal generator 104, and one or more external computing devices.

Figure 2:
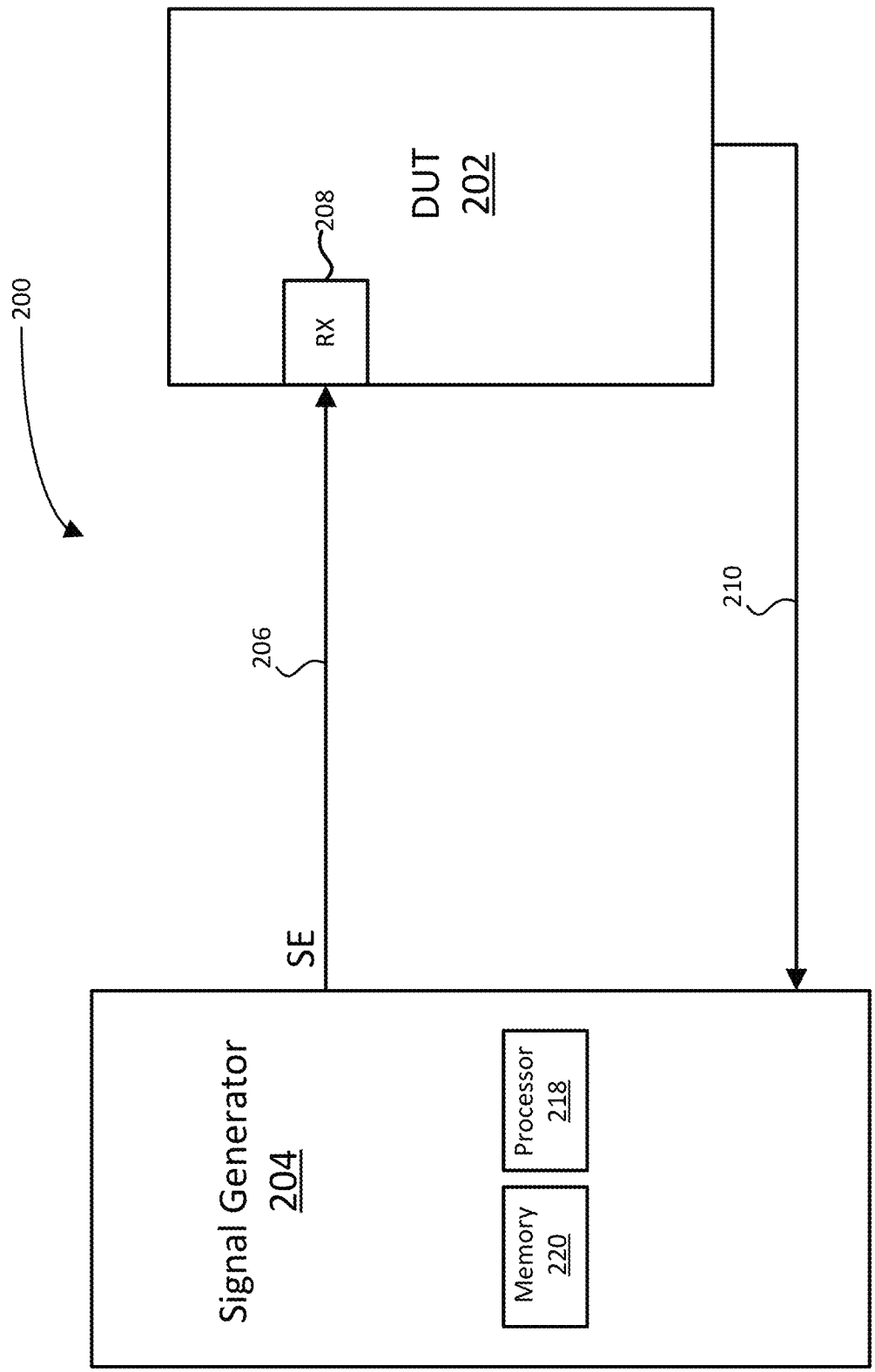
FIG. 2 is a block diagram of a test and measurement system for conducting receiver testing of a DUT after calibration of the signal generator of FIG. 1 to provide the stressed signal in accordance with some embodiments of the present disclosure.

FIG. 2 is a block diagram of a test and measurement system 200 for conducting receiver RX testing of a DUT 202 after calibration of a signal generator 204 to provide a stressed signal SE in accordance with some embodiments of the present disclosure. The signal generator 204 corresponds to the signal generator 104 of FIG. 1 after calibration of the signal generator to generate the stressed signal SE required under the PCIe 6.0 standard to perform testing of a receiver RX of the DUT 202. The signal generator 204 is coupled through a communication link 206 to a receiver RX 208 in the DUT 202. The DUT 202 can be a wide variety of different types of electronic circuits, and although only one receiver RX is shown in FIG. 2 to simplify the figure, the DUT would typically include multiple receivers RX 208 for respective lanes of the PCIe 6.0 bus of the DUT. The receiver RX 208 is part of PCIe 6.0 bus components contained in the DUT 202, and is to be tested to verify proper operation when receiving the stressed signal SE from the signal generator 204. As discussed above, the stressed signal SE emulates a signal from a worst case PCIe 6.0 transmitter TX under the specifications of the PCIe 6.0 standard.

The signal generator 204 includes a processor 218 and a memory 220 corresponding to the processor 118 and memory 120 of FIG. 1. The memory 220 also stores software or firmware for executing a routine to perform testing of the receiver RX 208. In operation, the signal generator 204 establishes communication over the communications link 206 with the DUT 202 and then sends a test pattern bit stream encoded in the stressed signal SE for capture by the receiver RX 208. The receiver RX 208 captures the stressed signal SE to digitize the signal, and decodes the digitized signal into a corresponding captured bit stream. The captured bit stream for the stressed signal SE in the DUT 202 should, ideally, correspond to the test pattern bit stream encoded in the stressed signal SE from the signal generator 204. To verify the receiver RX 208 is functioning properly in capturing and decoding the stressed signal SE, the captured bit stream generated by the receiver RX 208 is communicated over a communications link 210 to the signal generator 204. The signal generator 204 then compares the captured bit stream received over the communications link 210 from the DUT 202 to the test pattern bit stream encoded on the stressed signal SE provided by the signal generator. These two bit streams should ideally be the same. Through this comparison the signal generator 204 verifies whether the receiver RX 208 is operating properly such that the captured bit pattern from the receiver RX satisfied a specified bit error rate (BER). Although the communication link 210 is shown as being separate from communications link 206, the communication link 210 may be part of the same lane of the PCIe 6.0 bus represented by the communication link 206. In this situation, the captured bit pattern from the DUT 202 would be transmitted back to the signal generator 204 for verification over the same lane (i.e., communication link 206) through which the stressed signal SE is being communicated.

Figure 3:
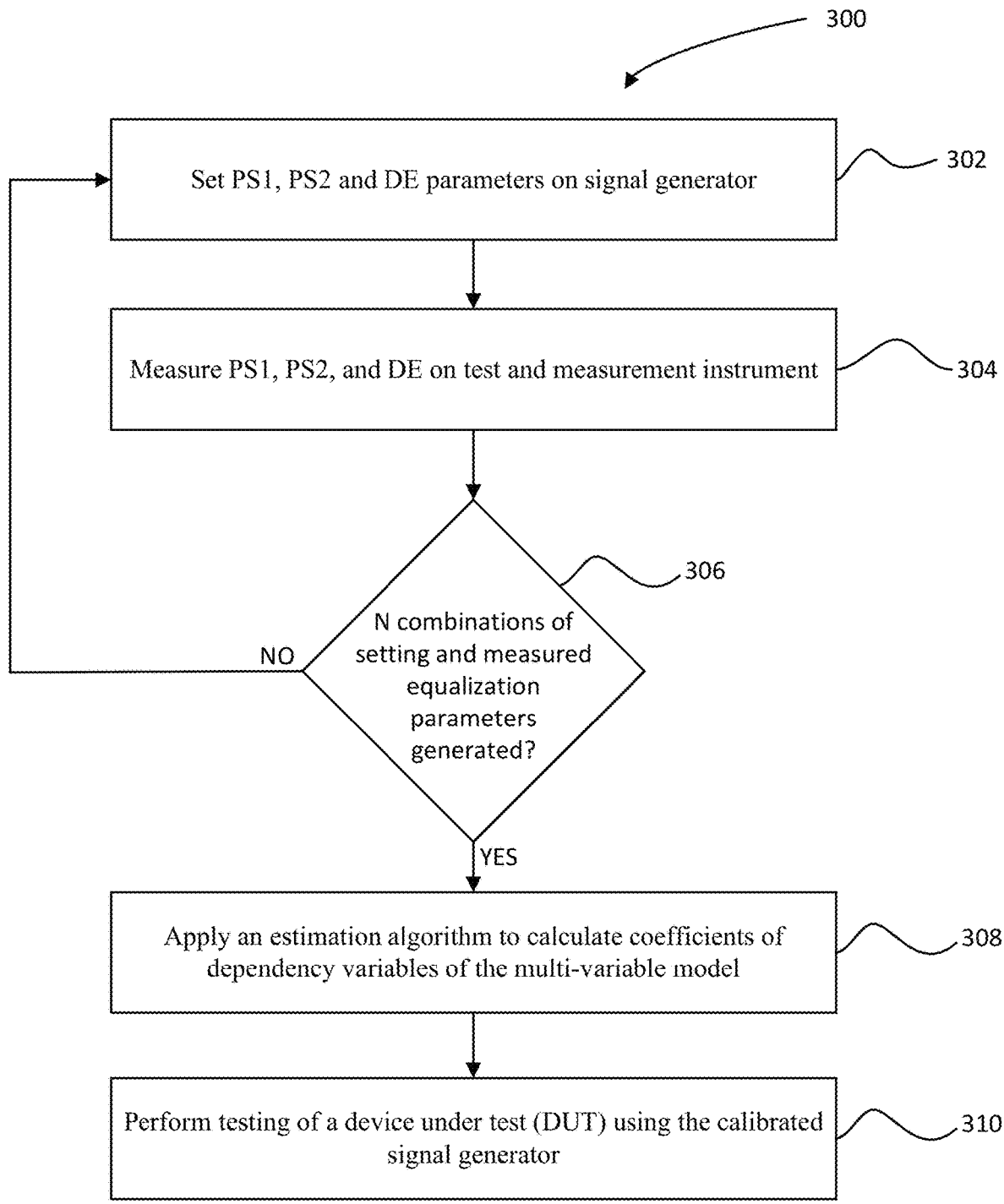
FIG. 3 is a flowchart of an example multi-variable calibration process executed by the master test and measurement instrument of FIG. 1 in accordance with some embodiments of the present disclosure.

FIG. 3 is a flowchart of a multi-variable calibration process or operation 300 executed by the master test and measurement instrument 102A of FIG. 1 in accordance with some embodiments of the present disclosure. The multi-variable calibration process 300 corresponds to one embodiment of calibration operations or processes performed by the calibrator 106 of FIG. 1. In some embodiments of the present disclosure, the multi-variable calibration operation 300 utilizes a linear model for the PS1, PS2, and DE equalization parameters. This linear model assumes the "setting" preshoot equalization parameters PS1(setting), PS2(setting) and the deemphasis equalization parameter DE(setting) are a linear function, or depend linearly on, the "actual" or "measured" equalization parameters PS1(measured), PS2(measured), and DE(measured). The multi-variable linear model may be expressed through the following equation:

$$\begin{bmatrix} PS1(\text{setting}) \\ PS2(\text{setting}) \\ DE(\text{setting}) \end{bmatrix} = \begin{bmatrix} \alpha 1 & \beta 1 & \omega 1 \\ \alpha 2 & \beta 2 & \omega 2 \\ \alpha 3 & \beta 3 & \omega 3 \end{bmatrix} \begin{bmatrix} PS1(\text{measured}) \\ PS2(\text{measured}) \\ DE(\text{measured}) \end{bmatrix} + \begin{bmatrix} \sigma 1 \\ \sigma 2 \\ \sigma 3 \end{bmatrix} \quad \text{EQN1}$$

In this multi-variable linear model, the matrices $$\begin{bmatrix} \alpha 1 & \beta 1 & \omega 1 \\ \alpha 2 & \beta 2 & \omega 2 \\ \alpha 3 & \beta 3 & \omega 3 \end{bmatrix} \text{ and } \begin{bmatrix} \sigma 1 \\ \sigma 2 \\ \sigma 3 \end{bmatrix}$$

must be estimated. The elements of these matrices are referred to as coefficients of dependency variables in the present description. These matrices in the equation EQN1 yield the following individual equations for the equalization parameters PS1(setting), PS2(setting), and DE(setting):

$PS1(\text{setting}) =$ $\alpha 1 * PS1(\text{measured}) + \beta 1 * PS2(\text{measured}) + \omega 1 * DE(\text{measured}) + \sigma 1;$ $PS2(\text{setting}) =$ $\alpha 2 * PS1(\text{measured}) + \beta 2 * PS2(\text{measured}) + \omega 2 * DE(\text{measured}) + \sigma 2;$ and $DE(\text{setting}) =$ $\alpha 3 * PS1(\text{measured}) + \beta 3 * PS2(\text{measured}) + \omega 3 * DE(\text{measured}) + \sigma 3.$ The determination or calculation of these coefficients of dependency variables $\alpha$, $\beta$, $\omega$, and $\sigma$ variables for EQN3 will not be described in more detail with reference to the multi-variable calibration process 300 of FIG. 3 and the test and measurement system 100 of FIG. 1. The process 300 begins at operation 302 by setting a preset combination of the equalization parameters PS1, PS2 and DE on the signal generator 104. As mentioned above, the PCIe 6.0 standard defines 127 preset combinations or "presets" of allowable combinations of values for the PS1, PS2, and DE equalization parameters to be utilized in signal generator calibration. Thus, in operation 302 the PS1(setting), PS2(setting), and DE(setting) equalization parameters on the signal generator 104 are set to one of these preset combinations. The signal generator 104 thereafter provides the stressed signal SE generated using these equalization parameters PS1(setting), PS2(setting), and DE(setting) to the test and measurement instruments 102A, 102B.

From operation 302, the process 300 proceeds to an operation 304 in which the test and measurement instruments 102A, 102B capture the stressed signal SE being provided by the signal generator 104 and from the samples of these captured signals the master test and measurement instrument 102A calculates or determines the PS1 (measured), PS2(measured), and DE(measured) equalization parameters. Each of the equalization parameters PS1, PS2, and DE is defined in terms of electrical parameters of the stressed signal SE, and is typically expressed in decibels (dB). The calculations performed on the captured stressed signal SE by the master test and measurement instrument 102A in determining the PS1(measured), PS2(measured), and DE(measured) equalization parameters will be understood by those skilled in the art, and thus, for the sake of brevity, will not be described in detail herein.

After operation 304 has been completed, the process 300 proceeds to operation 306 and determines whether N combinations of PS1(setting), PS2(setting), and DE(setting) equalization parameters have been set on the signal generator 104 and corresponding PS1(measured), PS2(measured), and DE(measured) equalization parameters calculated in operation 304. These N combinations of "setting" equalization parameters on the signal generator and corresponding "measured" equalization parameters as calculated by the calibrator 106 on the master test and measurement instrument 102A define a calibration data set. This calibration data set will be utilized to calculate the coefficients of dependency variables $\alpha$, $\beta$, $\omega$, and $\sigma$ of the multi-variable model set forth in EQN1. When the determination in operation 306 is negative, N combinations of setting and measured equalization parameters have not yet been created and calculated in operations 302 and 304. In this situation, when the determination in operation 306 is negative the process 300 goes back to operation 302 and a new combination of PS1(setting), PS2(setting), and DE(setting) equalization parameters are provided to the signal generator 104 for generation of a new stressed signal SE by the signal generator. The test and measurement instruments 102A, 102B thereafter capture the new stressed signal SE being provided by the signal generator 104 in operation 304 and the master test and measurement instrument 102A then calculates the corresponding PS1(measured), PS2(measured), and DE(measured) equalization parameters for new stressed signals.

The process 300 continues the execution of operations 302-306 until the determination in operation 306 is positive, indicating the calibration data set of N combinations of setting and measured equalization parameters has been generated through execution of operations 302 and 304. The calibration data set includes N combinations of "setting"

equalization parameters supplied to the signal generator 104 and N corresponding "measured" equalization parameters as calculated by the calibrator 106 on the master test and measurement instrument 102A. In one embodiment, N=16 so that the calibration data set includes sixteen combinations of setting and measured equalization parameters. The sixteen combinations of setting and measured equalization parameters should have values that cover the sample space or range of expected values for the PS1, PS2, and DE equalization parameters.

Once the determination in operation 306 is positive, the process 300 goes to operation 308 and the calibrator 106 applies an estimation operation to calculate the coefficients of the dependency variables $\alpha$, $\beta$, $\omega$, and $\sigma$ of EQN1. In one embodiment, the calibrator 106 utilizes a minimum mean square error (MMSE) estimation operation to calculate the coefficients of dependency variables $\alpha$, $\beta$, $\omega$, and $\sigma$. Thus, in operation 308 the calibrator 106 executes a MMSE estimation operation utilizing the sixteen combinations of setting and measured equalization parameters generated once the determination in operation 306 is true to calculate the coefficients of the dependency variables for the matrices $$\begin{bmatrix} \alpha 1 & \beta 1 & \omega 1 \\ \alpha 2 & \beta 2 & \omega 2 \\ \alpha 3 & \beta 3 & \omega 3 \end{bmatrix} \text{ and } \begin{bmatrix} \sigma 1 \\ \sigma 2 \\ \sigma 3 \end{bmatrix}$$

in EQN1. At this point in the process 300, the signal generator 104 has been calibrated and may now be utilized to perform testing of a receiver RX of a DUT. Accordingly, after completion of operation 308, the process 300 proceeds to operation 310 and utilizes the signal generator 104 to perform PCIe 6.0 testing of a receiver RX of a DUT as discussed above with reference to FIG. 2. In testing of a receiver RX, the EQN1 is utilized to provide values for the PS1(setting), PS2(setting), and DE(setting) equalization parameters supplied to the signal generator 104 such that the corresponding PS1(measured), PS2(measured), and DE(measured) equalization parameters have the desired values to perform testing of a receiver RX of the DUT.

In one embodiment, the resulting equation for a pulsed pattern generator (PPG) of a BERT is given by an equation EQN2 as follows:

$$\begin{bmatrix} PS1(\text{setting}) \\ PS2(\text{setting}) \\ DE(\text{setting}) \end{bmatrix} = \begin{bmatrix} 0.93 & 0.08 & -0.01 \\ -0.02 & 1.24 & -0.2 \\ 0.18 & -0.2 & 0.97 \end{bmatrix} \begin{bmatrix} PS1(\text{measured}) \\ PS2(\text{measured}) \\ DE(\text{measured}) \end{bmatrix} + \begin{bmatrix} 0.39 \\ -0.2 \\ -0.03 \end{bmatrix} \quad \text{EQN 2}$$

The multi-variable calibration process 300 utilizing the linear model of equation EQN1 and the more specific embodiment of this model set forth in equation EQN2 was validated with different combinations of desired PS1(setting), PS2(setting), DE(setting) equalization parameters listed in the PCIe 6.0 standard at a data transfer rate of 64 GT/s. Recall, as mentioned above, the PCIe 6.0 standard defines 127 preset combinations or "presets" of allowable combinations of values for the PS1, PS2, and DE equalization parameters to be utilized in signal generator calibration. To perform this validation, the model of equations EQN1 and EQN2 was utilized to provide instrument setting values for the signal generator 104. For each preset combination, desired PS1(measured), PS2(measure) and DE(measured) values are input to these model equations, and the corresponding PS1(setting), PS2(setting) and DE(setting) values calculated. These PS1(setting), PS2(setting) and DE(setting) setting values are used to configure the signal generator 104. Thereafter, these three equalization parameters PS1(measured), PS2(measured), DE(measured) are measured using the oscilloscope 102A, 102B. These measured values were then compared with the expected or desired values to determine how well the model provided the desired values measured for the equalization parameters PS1(measured), PS2(measured), DE(measured) after configuration of the signal generator 104 using the model.

Figure 4:
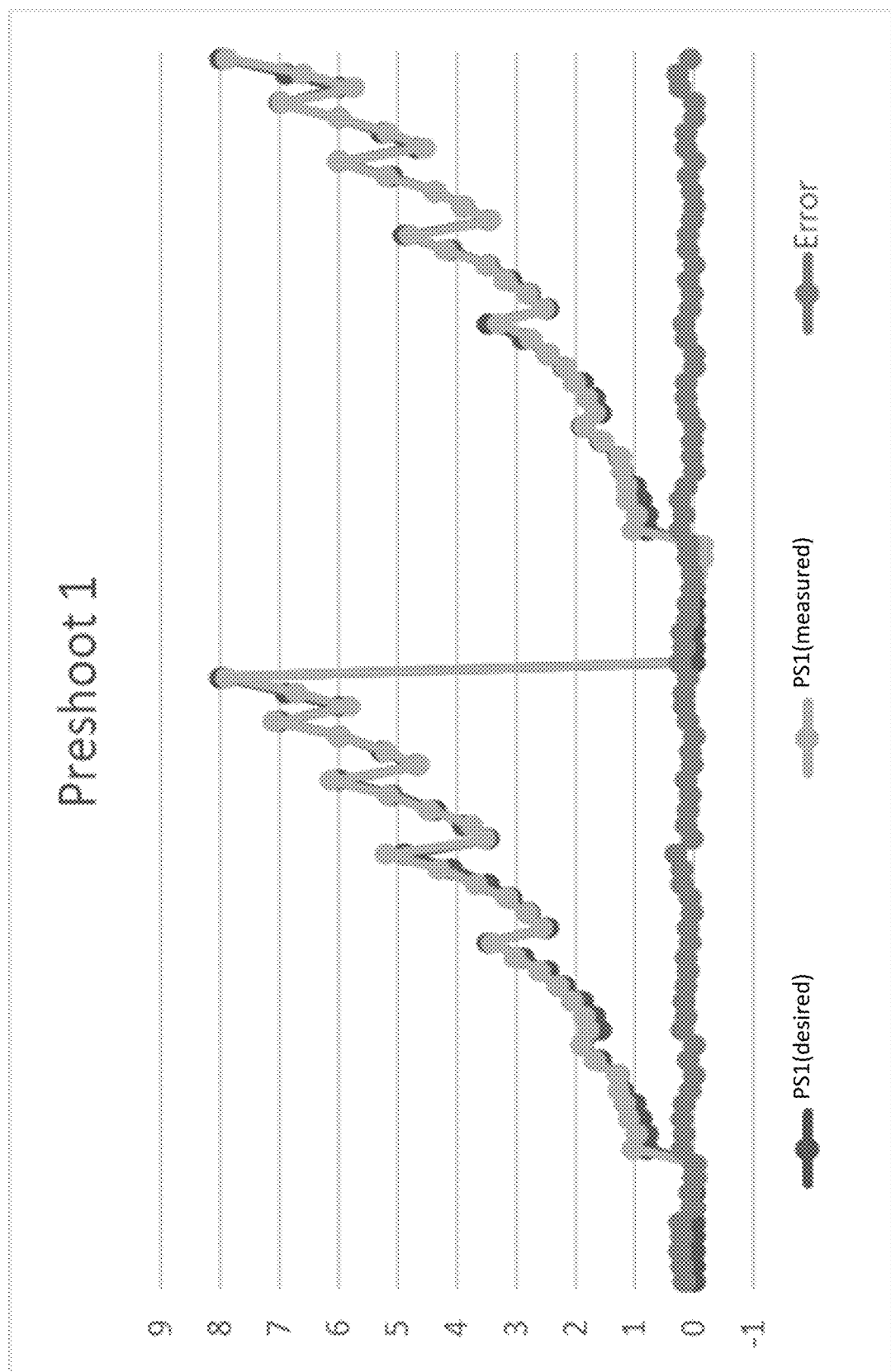
FIG. 4 is a graph illustrating desired, measured, and error values for a first preshoot parameter calculated by the multi-variable calibration process of FIG. 3 in accordance with some embodiments of the present disclosure.
Figure 5:
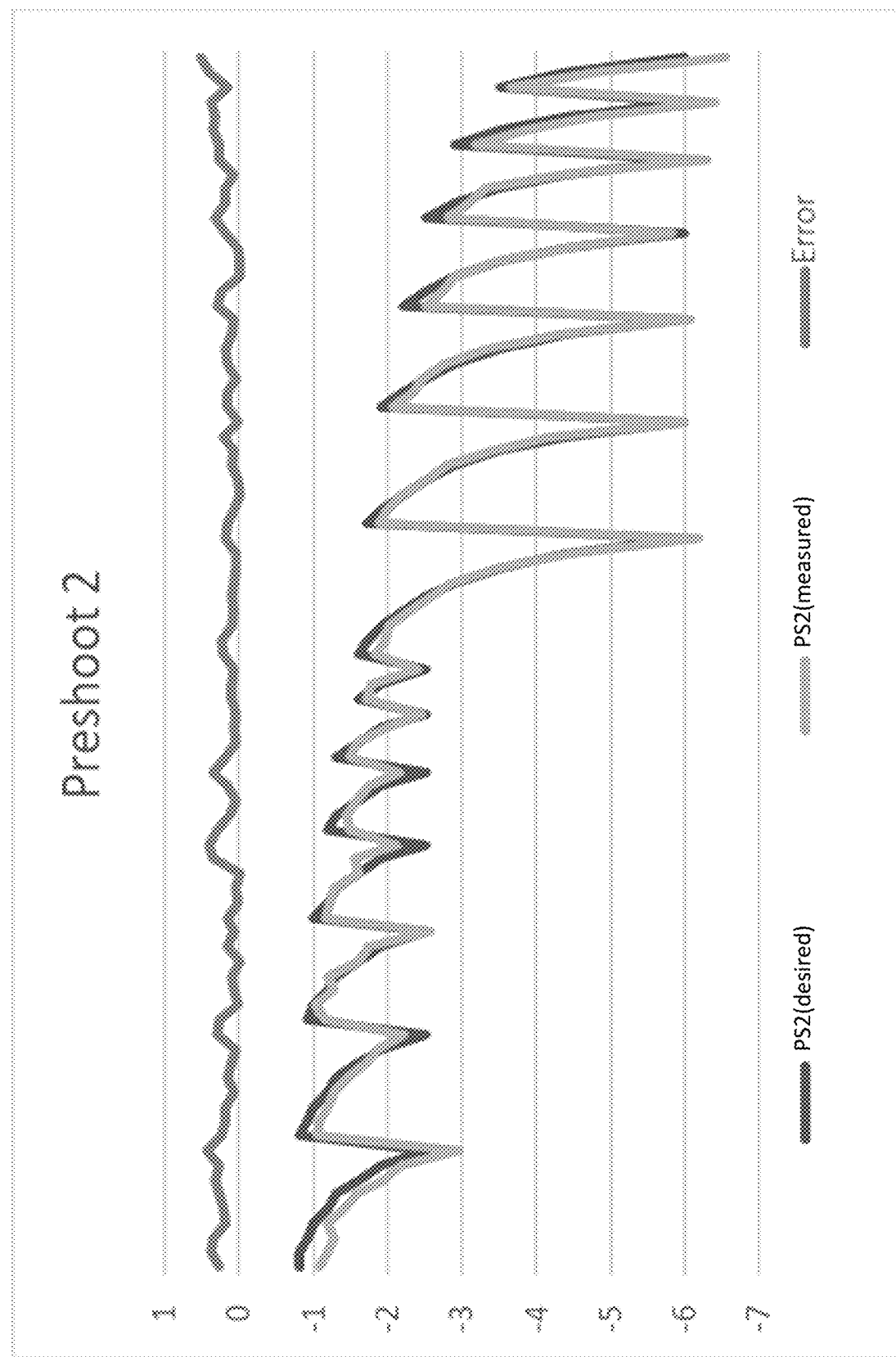
FIG. 5 is a graph illustrating desired, measured, and error values for a second preshoot parameter calculated by the multi-variable calibration process of FIG. 3 in accordance with some embodiments of the present disclosure.
Figure 6:
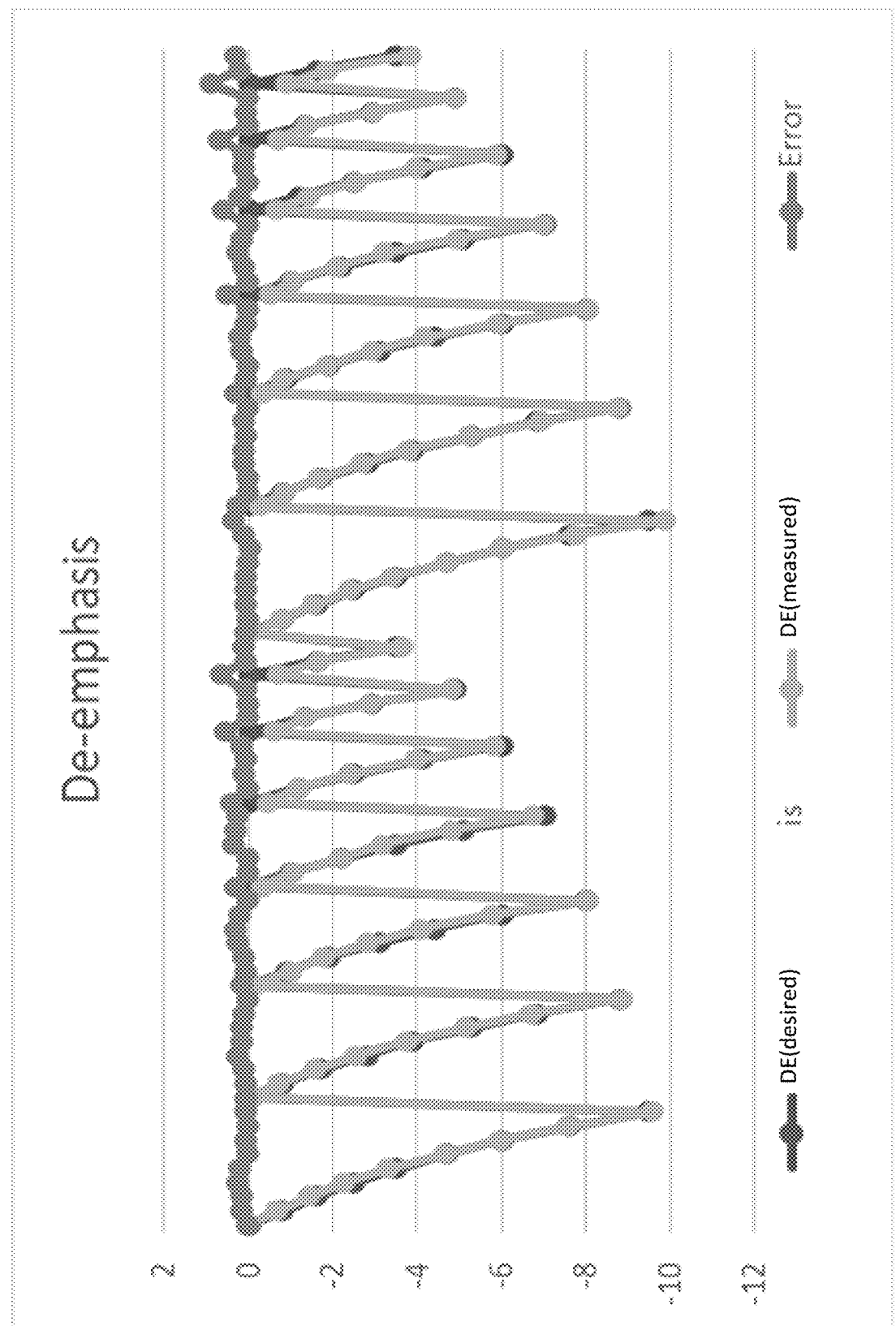
FIG. 6 is a graph illustrating desired, measured, and error values for a de-emphasis parameter calculated by the multi-variable calibration process of FIG. 3 in accordance with some embodiments of the present disclosure.

FIGS. 4-6 are graphs illustrating the results of the validation tests performed for the multi-variable calibration process 300 using equations EQN1, EQN2. The vertical axis in each of these figures shows the desired and measured values, in decibels (dB), and the horizontal axis illustrates the 84 presets of the corresponding equalization parameter utilized in the validation. FIG. 4 is a graph illustrating set PS1(desired), measured PS1(measured), and error values for the PS1 equalization parameter in the multi-variable calibration process 300 of FIG. 3 in accordance with some embodiments of the present disclosure. The error between the desired and measured values of PS1 equalization parameter is small as illustrated in this graph. FIG. 5 similarly shows these same values for the equalization parameters PS2(desired) and PS2(measured), and the error between these two values. FIG. 6 similarly shows these same values for the equalization parameters DE(desired) and DE(measured), and the error between these two values.

In embodiments of the present disclosure, the average error for the de-emphasis equalization parameter DE was 0.2 dB, average error for the first preshoot equalization parameter PS1 was 0.11 dB, and average error for the second preshoot equalization parameter was 0.15 dB when using the multi-variable model of equation EQN1 for calibration of the signal generator 104. The PCIe 6.0 standard requires the error between the desired and measured parameters to be within +/−0.5 dB for the signal generator 104 to pass calibration criteria or transmitter EQ tests. The error realized while using the multi-variable model of equation EQN1 was within passing margins of the required transmitter Tx EQ tests 99% of the time for the test cases utilized. There were 1% of cases where the error was between 0.5 dB and 1 dB, and thus did not satisfy the criteria for proper calibration pursuant to the transmitter TX EQ tests set forth in the PCIe 6.0 standard.

In embodiments of the present disclosure, the time required for calibration of the signal generator 104 is greatly reduced compared to current conventional approaches. Calibration of the signal generator 104 was completed in approximately fifteen minutes utilizing the calibration process 300 of FIG. 3, which is ten times faster than current conventional calibration processes, such as iterative adjustment of the equalization parameters. The dependence of the equalization parameters, particularly the dependence of the PS2 parameter on the PS1 and DE parameters, makes such iterative approaches more difficult and time intensive.

The multi-variable calibration process 300 according to embodiments of the present disclosure is not limited to utilizing a linear model as set forth in equation EQN1 for the dependencies or relationships between the PS1(setting), PS2(setting), DE(setting) and PS1(measured), PS2(measure), DE(measured) equalization parameters. In some embodiments, the process 300 may utilize a higher order model for estimating dependencies between the setting and measured equalization parameters, such as a quadratic model.

As mentioned above, in some embodiments, the multi-variable calibration process 300 may utilize two different models as part of the signal generator 104 calibration process. The embodiment of the multi-variable calibration process 300 discussed above with references to FIGS. 3-6 corresponds to a linear three-variable model for the PS1, PS2 and DE equalization parameters for preset combinations where the equalization parameter PS2≠0. In some embodiments, the multi-variable calibration process 300 utilizes a linear two-variable model for preset combinations where the parameter PS2=0. In this situation, some embodiments of the process 300 utilize the two-variable multi-variable model given by the following equation:

$$\begin{bmatrix} PS1(\text{setting}) \\ DE(\text{setting}) \end{bmatrix} = \begin{bmatrix} \alpha 1 & \beta 1 \\ \alpha 2 & \beta 2 \end{bmatrix} \begin{bmatrix} PS1(\text{measured}) \\ DE(\text{measured}) \end{bmatrix} + \begin{bmatrix} \sigma 1 \\ \sigma 2 \end{bmatrix} \quad \text{EQN 3}$$

In the same way as discussed above in relation to equation EQN1, the dependency variables of the matrices $$\begin{bmatrix} \alpha 1 & \beta 1 \\ \alpha 2 & \beta 2 \end{bmatrix} \text{ and } \begin{bmatrix} \sigma 1 \\ \sigma 2 \end{bmatrix}$$

need to be estimated. This is done in substantially the same was as described above in relation to FIGS. 1-3 for the calibration process 300 implementing the three-variable multi-variable model given by equation EQN1, and thus this overall process will not again be described in more detail, but only differences relating to the two-variable multi-variable model will be discussed. When the multi-variable model of EQN3 is implemented by the calibration process 300, this model is utilized only for preset combination of the equalization parameters PS1, PS2 and DE where PS2=0. In one embodiment, the variable N=6 in the operation 306 of process 300 for the two-variable multi-variable model. Once again, the calibration data set includes N combinations of "setting" equalization parameters supplied to the signal generator 104 and N corresponding "measured" equalization parameters as calculated by the calibration process 300. In one embodiment, N=6 so that the calibration data set includes six combinations of setting and measured equalization parameters. Once again, these six combinations of setting and measured equalization parameters should have values covering a sample space or range of expected values for the PS1 and DE equalization parameters.

In one embodiment of the linear two-variable model, the resulting equation for a pulsed pattern generator (PPG) of a BERT is given by an equation EQN4 as follows:

$$\begin{bmatrix} PS1(\text{setting}) \\ DE(\text{setting}) \end{bmatrix} = \begin{bmatrix} 1.04 & 0.02 \\ 0.12 & 0.99 \end{bmatrix} \begin{bmatrix} PS1(\text{measured}) \\ DE(\text{measured}) \end{bmatrix} + \begin{bmatrix} -0.15 \\ -0.19 \end{bmatrix} \quad \text{EQN 4}$$

Figure 7:
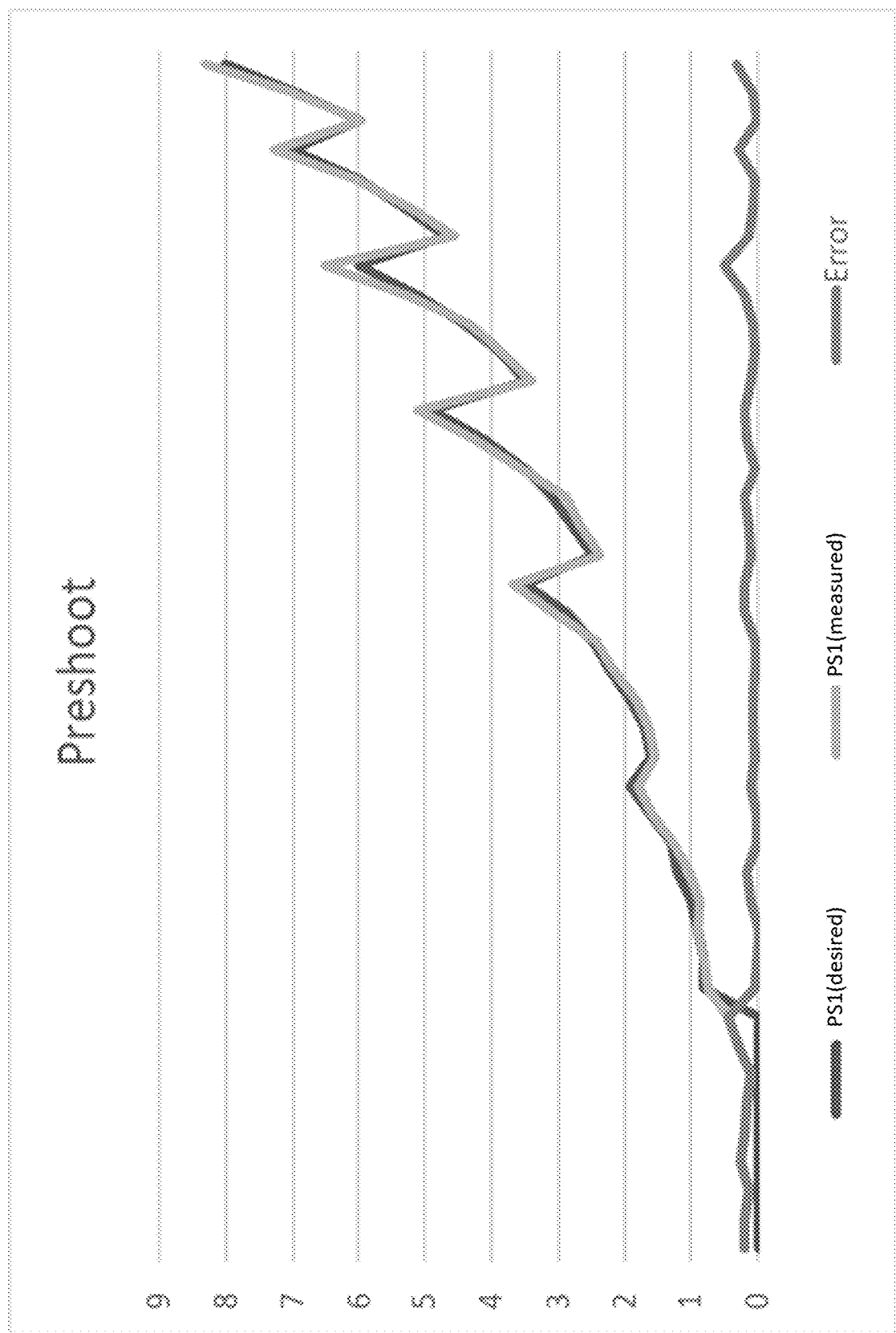
FIG. 7 is a graph illustrating desired, measured, and error values for a first preshoot parameter calculated by the multi-variable calibration process of FIG. 3 where a second preshoot value is zero in accordance with some embodiments of the present disclosure.
Figure 8:
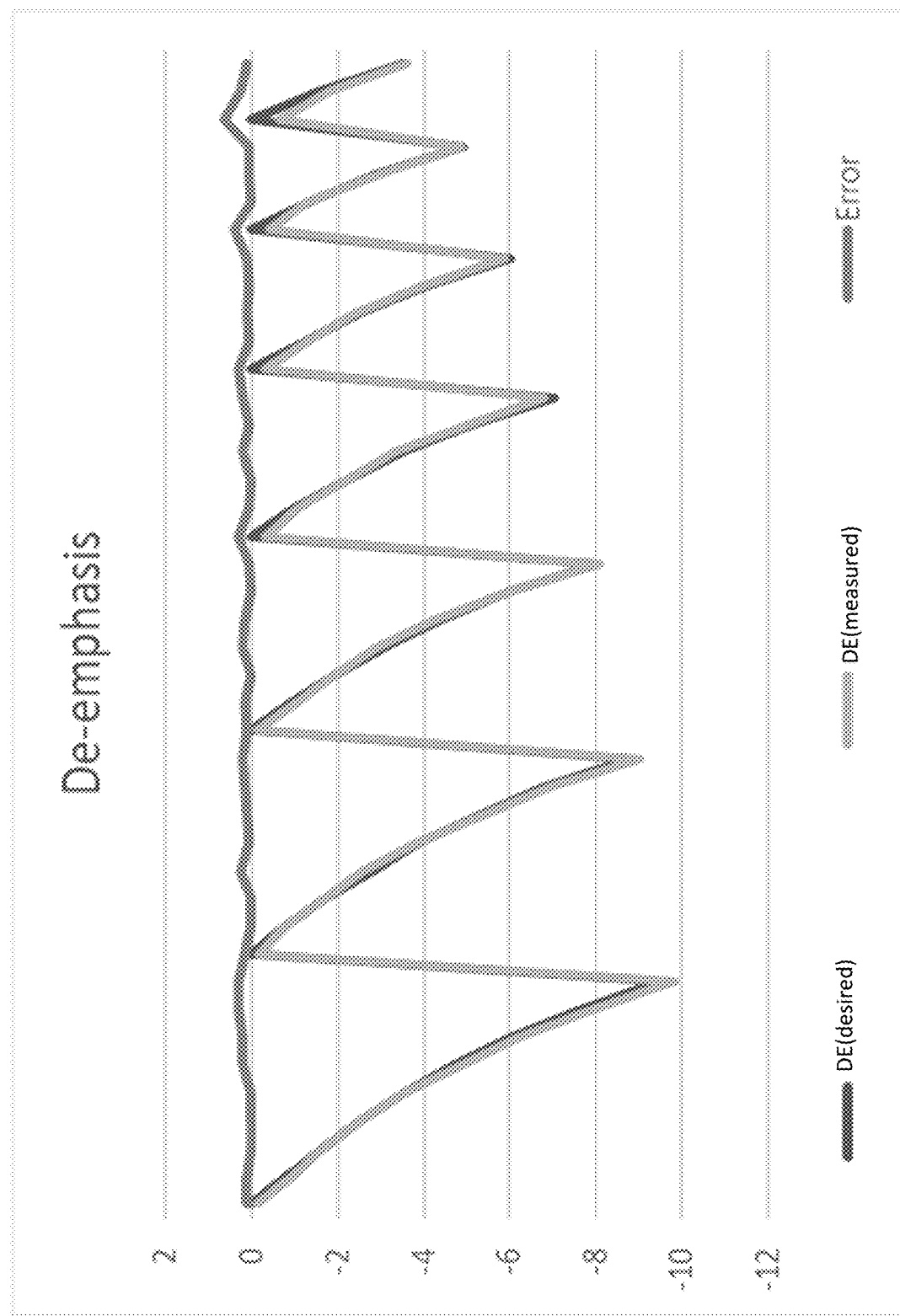
FIG. 8 is a graph illustrating desired, measured, and error values for a de-emphasis parameter calculated by the multi-variable calibration process of FIG. 3 where a second preshoot value is zero in accordance with some embodiments of the present disclosure.

The multi-variable calibration process 300 utilizing the two-variable linear model of equations EQN3 and EQN4 was validated with different combinations of desired PS1 (setting) and DE(setting) equalization parameters (PS2(setting)=0) listed in the PCIe 6.0 standard at a data transfer rate of 64 GT/s. FIGS. 7 and 8 are graphs illustrating the results of the validation tests performed for of the multi-variable calibration process 300 using equations EQN3 and EQN4. The vertical axis in each of these figures shows the desired and measured values, in decibels (dB), and the horizontal axis illustrates the 42 presets of the corresponding equalization parameter utilized in the validation. FIG. 7 is a graph illustrating PS1(desired), PS1(measured), and error values for the PS1 equalization parameter while FIG. 8 shows these same values for the equalization parameters DE(desired) and DE(measured), and the error between these two values. The error as seen in FIGS. 7 and 8 between desired and measured values of the PS1, DE equalization parameter is small as illustrated in these graphs.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

EXAMPLES

Illustrative examples of the technologies disclosed herein are provided below. A configuration of the technologies may include any one or more, and any combination of, the examples described below.

Example 1 is a method including selecting desired values for a set of two or more equalization parameters of a stressed signal to be generated by a signal generator; setting values of the set of two or more equalization parameters on the signal generator based on the desired values and a multi-variable model defining relationships between the desired values and measured values of the two or more equalization parameters; providing the stressed signal generated by the signal generator to at least one test and measurement instrument; measuring the set of two or more equalization parameters of the stressed signal with the at least one test and measurement instrument; repeating the operations of selecting desired values through measuring the set of two or more equalization parameters N times to generate N combinations of measured sets of two or more equalization parameters from N combinations of desired values for the sets of two or more equalization parameters; applying an estimation operation to estimate coefficients of dependency variables of the multi-variable model defining relationships between the desired and measured set of two or more equalization parameters; and generating, using the multi-variable model including the estimated coefficients of the dependency variables, setting values for the set of two or more equalization parameters to calibrate the signal generator.

Example 2 is a method according to Example 1, wherein the set of two or more equalization parameters comprise a Preshoot1 (PS1), a Preshoot2 (PS2), and a de-emphasis (DE) equalization parameter.

Example 3 is a method according to Example 1 further comprising performing testing of a device under test (DUT) using the calibrated signal generator.

Example 4 is a method according to Example 1, wherein performing testing of the DUT using the calibrated signal generator comprises performing PCIe 6.0 receiver (RX) testing of the DUT.

Example 5 is a method according to Example 1, wherein the multi-variable model is a linear model.

Example 6 is a method according to Example 5, wherein the set of two or more equalization parameter is a Preshoot1 (PS1), Preshoot2 (PS2), and de-emphasis (DE) equalization parameter, and wherein the multi-variable model is given by a three-variable model defined by the following equation:

$$\begin{bmatrix} PS1(\text{setting}) \\ PS2(\text{setting}) \\ DE(\text{setting}) \end{bmatrix} = \begin{bmatrix} \alpha 1 & \beta 1 & \omega 1 \\ \alpha 2 & \beta 2 & \omega 2 \\ \alpha 3 & \beta 3 & \omega 3 \end{bmatrix} \begin{bmatrix} PS1(\text{measured}) \\ PS2(\text{measured}) \\ DE(\text{measured}) \end{bmatrix} + \begin{bmatrix} \sigma 1 \\ \sigma 2 \\ \sigma 3 \end{bmatrix}$$

wherein PS1(setting), PS2(setting) and DE(setting) are values for the PS1, PS2, and DE equalization parameters that are set on the signal generator and PS1(measured), PS2(measured), and DE(measured) are corresponding measured values of these equalization parameters on the at least one test and measurement instrument, and the selected desired values are desired values for the PS1(measured), PS2(measured), and DE(measured) equalization parameters.

Example 7 is a method according to Example 5, wherein the set of two or more equalization parameters is a Preshoot1 (PS1) and a de-emphasis (DE) equalization parameter, and wherein multi-variable model is given by a two-variable model defined by the following equation:

$$\begin{bmatrix} PS1(\text{setting}) \\ DE(\text{setting}) \end{bmatrix} = \begin{bmatrix} \alpha 1 & \beta 1 \\ \alpha 2 & \beta 2 \end{bmatrix} \begin{bmatrix} PS1(\text{measured}) \\ DE(\text{measured}) \end{bmatrix} + \begin{bmatrix} \sigma 1 \\ \sigma 2 \end{bmatrix}$$

wherein PS1(setting) and DE(setting) are values for the PS1 and DE equalization parameters that are set on the signal generator and PS1(measured) and DE(measured) are corresponding measured values of these equalization parameters on the at least one test and measurement instrument, and the selected desired values are desired values for the PS1(measured) and DE(measured) equalization parameters.

Example 8 is a method according to Example 1, wherein the estimation operation is a minimum mean square error (MMSE) operation.

Example 9 is a method according to Example 1, wherein the signal generator comprises a bit error rate tester (BERT).

Example 10 is a method according to Example 1, wherein the at least one test and measurement instrument comprises at least one oscilloscope.

Example 11 is a method according to Example 10, wherein the at least one oscilloscope comprises a master oscilloscope and an extension oscilloscope.

Example 12 is a method according to Example 11 wherein the lane of the bus comprises first and second differential signals, the first differential signal coupled to the master oscilloscope and the second differential signal coupled to the extension oscilloscope.

Example 13 is a test and measurement system including a signal generator configured to generate a stressed signal having characteristics defined by parameters including a set of two or more equalization parameters; and at least one test and measurement instrument coupled to the signal generator to receive the stressed signal, the at least one test and measurement instrument configured to capture the stressed signal and including a processor configured to execute a calibration operation to: select desired values of the set of two or more equalization parameters of a stressed signal to be generated by a signal generator; set, on the signal generator, values for the set of two or more equalization parameters based on the desired values and a multi-variable model defining relationships between the desired values and measured values of the set of two or more equalization parameters; provide the stressed eye signal from the signal generator to the at least one test and measurement instrument; measure the set of two or more equalization parameters of the captured stressed signal; apply an estimation operation to estimate coefficients of dependency variables of a multi-variable model defining relationships between the desired and measured sets of two or more equalization parameters; and generate, using the multi-variable model including the estimated coefficients of the dependency variables, values for the set of two or more equalization parameters to calibrate the signal generator.

Example 14 is a test and measurement system according to Example 12, wherein the set of two or more equalization parameters include a Preshoot1 (PS1) equalization parameter, a Preshoot2 (PS2) equalization parameter, and de-emphasis (DE) equalization parameter.

Example 15 is a test and measurement system according to Example 12 further comprising performing testing of a device under test (DUT) using the calibrated signal generator.

Example 16 is a test and measurement system according to Example 14, wherein the testing of the DUT is testing of a PCIe 6.0 receiver (RX) of the DUT.

Example 17 is a test and measurement system according to Example 13, wherein the multi-variable model is a linear model.

Example 18 is a test and measurement system according to Example 17, wherein the set of two or more equalization parameter is a Preshoot1 (PS1), Preshoot2 (PS2), and de-emphasis (DE) equalization parameter, and wherein the multi-variable model is given by a three-variable model defined by the following equation:

$$\begin{bmatrix} PS1(\text{setting}) \\ PS2(\text{setting}) \\ DE(\text{setting}) \end{bmatrix} = \begin{bmatrix} \alpha 1 & \beta 1 & \omega 1 \\ \alpha 2 & \beta 2 & \omega 2 \\ \alpha 3 & \beta 3 & \omega 3 \end{bmatrix} \begin{bmatrix} PS1(\text{measured}) \\ PS2(\text{measured}) \\ DE(\text{measured}) \end{bmatrix} + \begin{bmatrix} \sigma 1 \\ \sigma 2 \\ \sigma 3 \end{bmatrix}$$

wherein PS1(setting), PS2(setting) and DE(setting) are values for the PS1, PS2, and DE equalization parameters that are set on the signal generator and PS1 (measured), PS2(measured), and DE(measured) are corresponding measured values of these equalization parameters on the at least one test and measurement instrument, and the and the selected desired values are desired values for the PS1(measured), PS2(measured), and DE(measured) equalization parameters.

Example 19 is a test and measurement system according to Example 17, wherein the set of two or more equalization parameters is a Preshoot1 (PS1) and a de-emphasis (DE) equalization parameter, and wherein multi-variable model is given by a two-variable model defined by the following equation:

$$\begin{bmatrix} PS1(\text{setting}) \\ DE(\text{setting}) \end{bmatrix} = \begin{bmatrix} \alpha 1 & \beta 1 \\ \alpha 2 & \beta 2 \end{bmatrix} \begin{bmatrix} PS1(\text{measured}) \\ DE(\text{measured}) \end{bmatrix} + \begin{bmatrix} \sigma 1 \\ \sigma 2 \end{bmatrix}$$

wherein PS1(setting) and DE(setting) are values for the PS1 and DE equalization parameters that are set on the signal generator and PS1(measured) and DE(measured) are corresponding measured values of these equalization parameters on the at least one test and measurement instrument, and the selected desired values are desired values for the PS1(measured) and DE(measured) equalization parameters.

Example 20 is a test and measurement system according to Example 13, wherein the estimation operation is a minimum mean square error (MMSE) operation.

Example 21 is a method including selecting desired values of a Preshoot1 (PS1), Preshoot2 (PS2), and de-emphasis (DE) equalization parameter of a stressed signal to be generated by a signal generator; setting values of the Preshoot1 (PS1), Preshoot2 (PS2), and de-emphasis (DE) equalization parameter on the signal generator based on the desired values and a multi-variable model defining relationships between the desired values and measured values of the PS1, PS2, DE equalization parameters; receiving a stressed signal from a signal generator, the stressed signal being generated based on Preshoot1 (PS1), Preshoot2 (PS2), and de-emphasis (DE) equalization parameters set on the signal generator; measuring the PS1, PS2, and DE equalization parameters of the received stressed signal; repeating the operations of selecting desired values through measuring the PS1, PS2, and DE equalization parameters N times to generate N combinations of measured PS1, PS2, and DE equalization parameters from N combinations of desired PS1, PS2 and DE equalization parameters; applying an estimation operation to estimate coefficients of dependency variables of the multi-variable model defining relationships between the desired and measured PS1, PS2, DE equalization parameters; and generating, using the multi-variable model including the estimated coefficients of the dependency variables, setting values for the PS1, PS2, DE equalization parameters to calibrate the signal generator.

Example 22 is a method according to Example 21, wherein the signal generator comprises a bit error rate tester (BERT).

Example 23 is a method according to Example 21 further comprising performing testing of a device under test (DUT) using the calibrated signal generator.

The foregoing description has been set forth merely to illustrate example embodiments of present disclosure and is not intended to be limiting. Since modifications of the disclosed embodiments incorporating the substance of the invention may occur to person skilled in the art, the invention should be construed to include everything within the scope of the invention.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that all features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A method, comprising:
    selecting desired values for a set of two or more equalization parameters of a stressed signal to be generated by a signal generator;
    setting values of the set of two or more equalization parameters on the signal generator based on the desired values and a multi-variable model defining relationships between the setting values and measured values of the two or more equalization parameters;
    providing the stressed signal generated by the signal generator to at least one test and measurement instrument;
    measuring the set of two or more equalization parameters of the stressed signal with the at least one test and measurement instrument;
    repeating operations of selecting desired values through measuring the set of two or more equalization parameters N times to generate N combinations of measured sets of two or more equalization parameters from N combinations of the setting values for the sets of two or more equalization parameters;

applying an estimation operation to estimate coefficients of dependency variables of the multi-variable model defining relationships between the setting and measured values for the sets of two or more equalization parameters;

generating, using the multi-variable model including the estimated coefficients of the dependency variables, setting values for the set of two or more equalization parameters to calibrate the signal generator for any desired combination of the set of two or more equalization parameters; and performing testing of a device under test (DUT) using the calibrated signal generator comprising performing receiver (RX) testing of the DUT.

2. The method of claim 1, wherein the set of two or more equalization parameters comprise a Preshoot1 (PS1), a Preshoot2 (PS2), and a de-emphasis (DE) equalization parameter.

3. The method of claim 1, wherein performing the RX testing of the DUT comprises performing PCIe 6.0 testing of the DUT.

4. The method of claim 1, wherein the multi-variable model is a linear model.

5. The method of claim 4, wherein the set of two or more equalization parameters is a Preshoot1 (PS1), Preshoot2 (PS2), and de-emphasis (DE) equalization parameter, and wherein the multi-variable model is given by a three-variable model defined by:

$$\begin{bmatrix} PS1(\text{setting}) \\ PS2(\text{setting}) \\ DE(\text{setting}) \end{bmatrix} = \begin{bmatrix} \alpha 1 & \beta 1 & \omega 1 \\ \alpha 2 & \beta 2 & \omega 2 \\ \alpha 3 & \beta 3 & \omega 3 \end{bmatrix} \begin{bmatrix} PS1(\text{measured}) \\ PS2(\text{measured}) \\ DE(\text{measured}) \end{bmatrix} + \begin{bmatrix} \sigma 1 \\ \sigma 2 \\ \sigma 3 \end{bmatrix}$$

wherein the PS1 (setting), the PS2 (setting) and the DE (setting) are values for the PS1, PS2, and DE equalization parameters that are set on the signal generator and the PS1 (measured), the PS2 (measured), and the DE (measured) are corresponding measured values of these equalization parameters on the at least one test and measurement instrument.

6. The method of claim 4, wherein the set of two or more equalization parameters is a Preshoot1 (PS1) and a de-emphasis (DE) equalization parameter, and wherein the multi-variable model is given by a two-variable model defined by:

$$\begin{bmatrix} PS1(\text{setting}) \\ DE(\text{setting}) \end{bmatrix} = \begin{bmatrix} \alpha 1 & \beta 1 \\ \alpha 2 & \beta 2 \end{bmatrix} \begin{bmatrix} PS1(\text{measured}) \\ DE(\text{measured}) \end{bmatrix} + \begin{bmatrix} \sigma 1 \\ \sigma 2 \end{bmatrix}$$

wherein the PS1 (setting) and the DE (setting) are values for the PS1 and DE equalization parameters that are set on the signal generator and the PS1 (measured) and the DE (measured) are corresponding measured values of these equalization parameters on the at least one test and measurement instrument.

7. The method of claim 1, wherein the estimation operation is a minimum mean square error (MMSE) operation.

8. The method of claim 1, wherein the signal generator comprises a bit error rate tester (BERT).

9. The method of claim 1, wherein the at least one test and measurement instrument comprises at least one oscilloscope.

10. The method of claim 9, wherein the at least one oscilloscope comprises a master oscilloscope and an extension oscilloscope.

11. The method of claim 10 wherein a lane of a bus comprises first and second differential signals, the first differential signal coupled to the master oscilloscope and the second differential signal coupled to the extension oscilloscope.

12. A test and measurement system, comprising:

a signal generator configured to generate a stressed signal having characteristics defined by parameters including a set of two or more equalization parameters; and at least one test and measurement instrument coupled to the signal generator to receive the stressed signal, the at least one test and measurement instrument configured to capture the stressed signal and including a processor configured to execute a calibration operation to:

select desired values of the set of two or more equalization parameters of the stressed signal to be generated by the signal generator;

set, on the signal generator, values for the set of two or more equalization parameters based on the desired values and a multi-variable model defining relationships between set values and measured values of the set of two or more equalization parameters;

provide the stressed signal from the signal generator to the at least one test and measurement instrument;

measure the set of two or more equalization parameters of the captured stressed signal;

apply an estimation operation to estimate coefficients of dependency variables of a multi-variable model defining relationships between the set and measured values for the set of two or more equalization parameters;

generate, using the multi-variable model including the estimated coefficients of the dependency variables, values for the set of two or more equalization parameters to calibrate the signal generator for any desired combination of the set of two or more equalization parameters; and perform testing of a device under test (DUT) using the calibrated signal generator comprising performing receiver (RX) testing of the DUT.

13. The test and measurement system of claim 12, wherein the set of two or more equalization parameters include a Preshoot1 (PS1) equalization parameter, a Preshoot2 (PS2) equalization parameter, and de-emphasis (DE) equalization parameter.

14. The test and measurement system of claim 12, wherein the RX testing of the DUT is testing of a PCIe 6.0 RX of the DUT.

15. The test and measurement system of claim 12, wherein the multi-variable model is a linear model.

16. The test and measurement system of claim 15, wherein the set of two or more equalization parameters is a Preshoot1 (PS1), Preshoot2 (PS2), and de-emphasis (DE) equalization parameter, and wherein the multi-variable model is given by a three-variable model defined by:

$$\begin{bmatrix} PS1(\text{setting}) \\ PS2(\text{setting}) \\ DE(\text{setting}) \end{bmatrix} = \begin{bmatrix} \alpha 1 & \beta 1 & \omega 1 \\ \alpha 2 & \beta 2 & \omega 2 \\ \alpha 3 & \beta 3 & \omega 3 \end{bmatrix} \begin{bmatrix} PS1(\text{measured}) \\ PS2(\text{measured}) \\ DE(\text{measured}) \end{bmatrix} + \begin{bmatrix} \sigma 1 \\ \sigma 2 \\ \sigma 3 \end{bmatrix}$$

wherein the PS1 (setting), the PS2 (setting) and the DE (setting) are values for the PS1, PS2, and DE equalization parameters that are set on the signal generator and the PS1 (measured), the PS2 (measured), and the DE (measured) are corresponding measured values of these equalization parameters on the at least one test and measurement instrument.

17. The test and measurement system of claim 15, wherein the set of two or more equalization parameters is a Preshoot1 (PS1) and a de-emphasis (DE) equalization parameter, and wherein the multi-variable model is given by a two-variable model defined by:

$$\begin{bmatrix} PS1(\text{setting}) \\ DE(\text{setting}) \end{bmatrix} = \begin{bmatrix} \alpha 1 & \beta 1 \\ \alpha 2 & \beta 2 \end{bmatrix} \begin{bmatrix} PS1(\text{measured}) \\ DE(\text{measured}) \end{bmatrix} + \begin{bmatrix} \sigma 1 \\ \sigma 2 \end{bmatrix}$$

wherein the PS1 (setting) and the DE (setting) are values for the PS1 and DE equalization parameters that are set on the signal generator and the PS1 (measured) and the DE (measured) are corresponding measured values of these equalization parameters on the at least one test and measurement instrument.

18. The test and measurement system of claim 12, wherein the estimation operation is a minimum mean square error (MMSE) operation.

19. A method, comprising:
  selecting desired values of a Preshoot1 (PS1), Preshoot2 (PS2), and de-emphasis (DE) equalization parameters of a stressed signal to be generated by a signal generator;
  setting values of the Preshoot1 (PS1), Preshoot2 (PS2), and de-emphasis (DE) equalization parameters on the signal generator based on the desired values and a multi-variable model defining relationships between the setting values and measured values of the PS1, PS2, DE equalization parameters;
  receiving the stressed signal from the signal generator, the stressed signal being generated based on Preshoot1 (PS1), Preshoot2 (PS2), and de-emphasis (DE) equalization parameters set on the signal generator;
  measuring values of the PS1, PS2, and DE equalization parameters of the received stressed signal;
  repeating operations of selecting desired values through measuring the PS1, PS2, and DE equalization parameters N times to generate N combinations of measured values for the PS1, PS2, and DE equalization parameters from N combinations of the setting values for the PS1, PS2 and DE equalization parameters;
  applying an estimation operation to estimate coefficients of dependency variables of the multi-variable model defining relationships between the setting and measured values of the PS1, PS2, and DE equalization parameters;
  generating, using the multi-variable model including the estimated coefficients of the dependency variables, setting values for the PS1, PS2, and DE equalization parameters to calibrate the signal generator for any desired combination of the PS1, PS2, and DE equalization parameters; and
  performing testing of a device under test (DUT) using the calibrated signal generator comprising performing receiver (RX) testing of the DUT.

20. The method of claim 19, wherein the signal generator comprises a bit error rate tester (BERT).

21. The method of claim 19, wherein performing the RX testing of the DUT comprises performing PCIe 6.0 RX testing of the DUT.

* * * * *